March 30, 1937.  A. HAUN  2,075,715
FISH NET
Filed Sept. 30, 1935   3 Sheets-Sheet 1
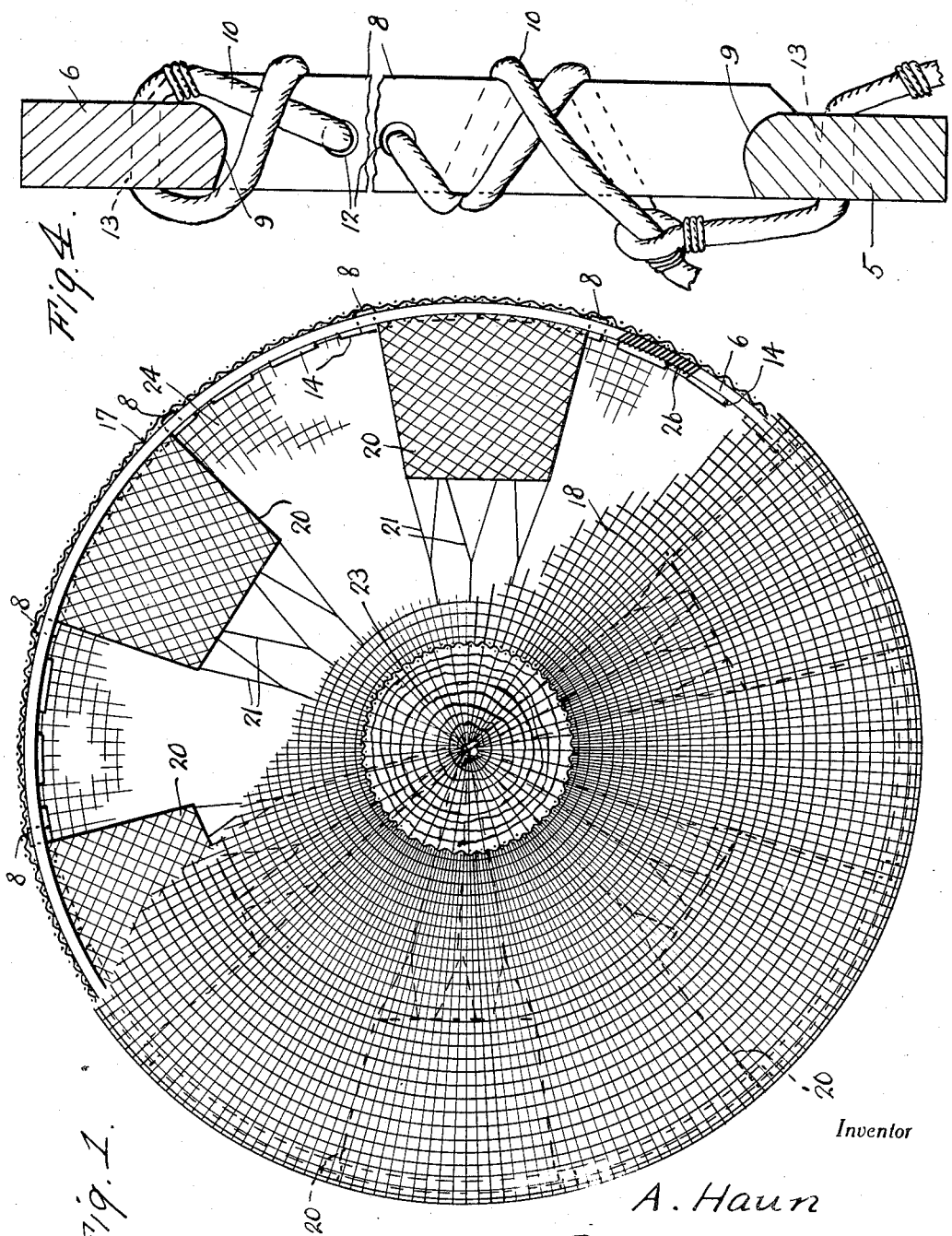

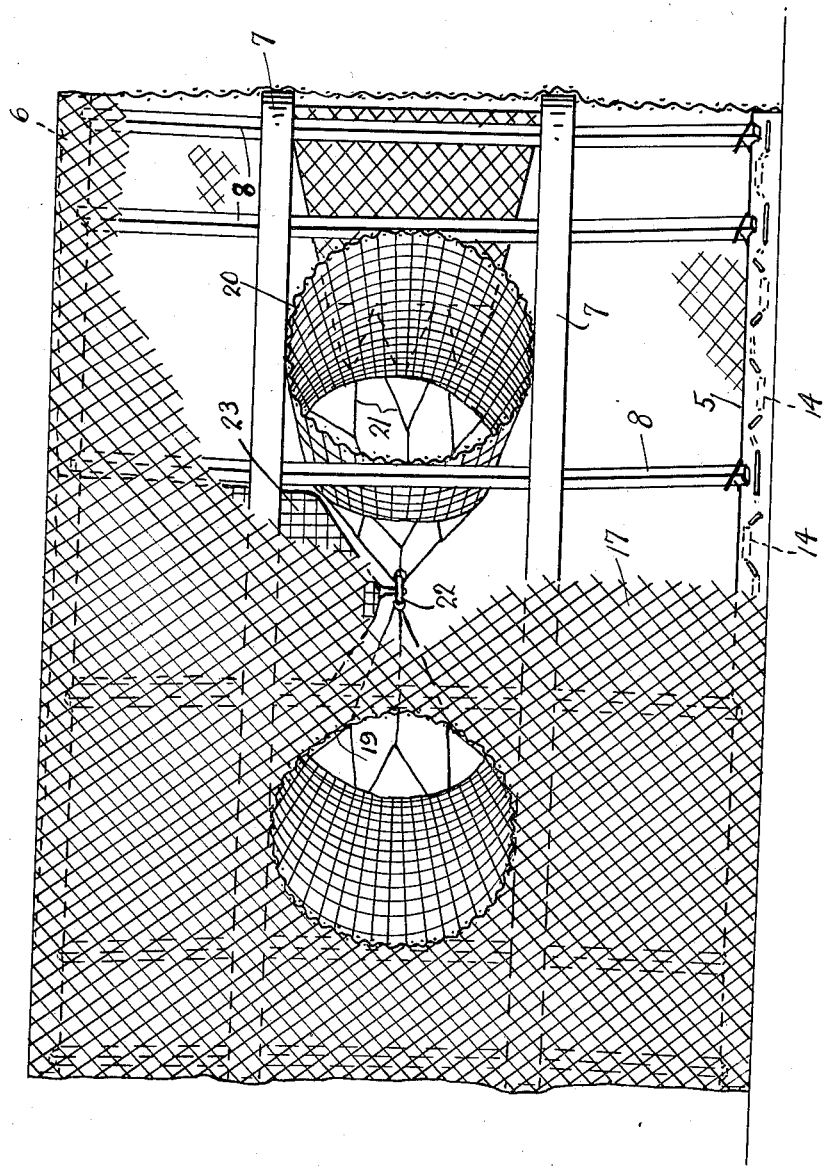

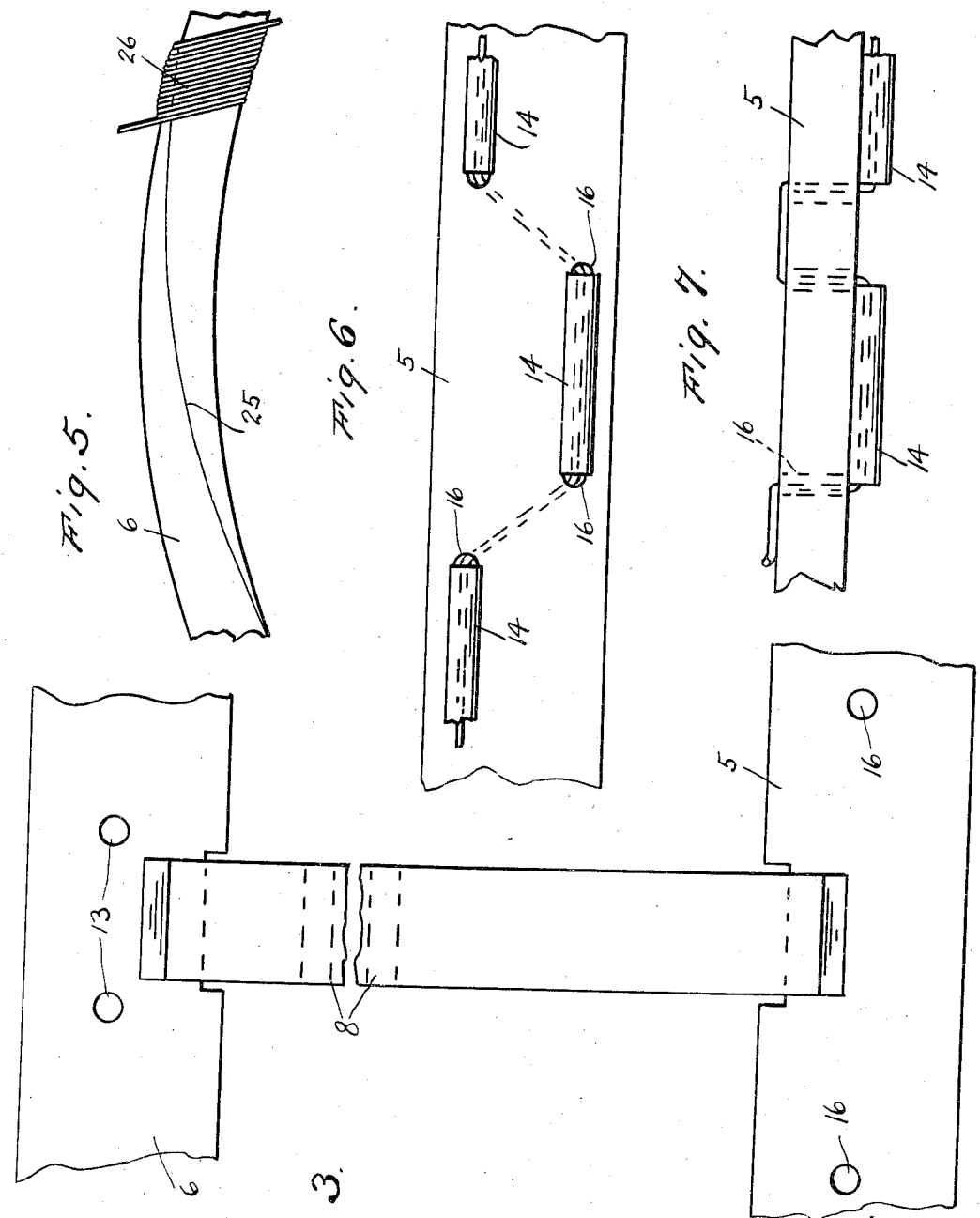

Patented Mar. 30, 1937

2,075,715

UNITED STATES PATENT OFFICE 2,075,715

FISH NET

Alonzo Haun, Phoenix, Ariz.

Application September 30, 1935, Serial No. 42,952

5 Claims. (Cl. 43—100)

This invention relates broadly to fish nets and an object of the invention is to provide a collapsible net particularly designed for use in still water and artificial lakes for clearing the same of carp.

A further object of the invention is to provide a collapsible non-corrosive net for trapping carp.

The invention together with its objects and advantages will be best understood from a study of the following description taken in connection with the accompanying drawings wherein:

Figure 1 is a top plan view of the net with certain parts broken away.

Figure 2 is a side elevational view of the net with certain parts broken away.

Figure 3 is a fragmentary enlarged elevational view showing portions of top and bottom ring members and an upright connecting said ring members.

Figure 4 is an enlarged detail sectional view showing the manner of detachably connecting the respective opposite ends of an upright member with the upper and lower ring members.

Figure 5 is a fragmentary plan view showing the manner of splicing the ends of one of the rings together.

Figure 6 is a fragmentary elevational view of a portion of a ring showing the manner of associating weights therewith.

Figure 7 is a top plan view of what is shown in Figure 6;

Referring to the drawings by reference numerals it will be seen the improved net or carp trap comprises a bottom or base ring 5, a top ring 6, and vertically spaced intermediate rings 7.

Supporting the rings 6 and 7 are a plurality of uprights 8. Each upright 8, as best shown in Figure 3, has its respective opposite ends provided with notches 9 that conformably receive the edges of the rings 5 and 6 respectively.

The respective opposite ends of the members 8 are detachably secured into engagement with the rings 5 and 6 through the medium of suitable lengths of rope or the like 10 that are spirally wrapped about the members 8 and threaded through openings 12 and 13 respectively provided in the members 8 and the rings 5 and 6 respectively as clearly shown in Figure 4.

The respective opposite end portions of the members 8 are offset from the plane of the intermediate portions of the members to provide what may be termed crotches receiving the rings 7 as best suggested in Figure 2.

For weighting the trap for properly holding it on the bed of the lake, there is provided a series of tubular weights 14 arranged in staggered relation on the inner side of the ring 5, and these weights are held in position through the medium of a suitable length of rope or the like 15 that is threaded through the weights 14 and through suitably provided and arranged openings 16 in the ring 5 and as clearly shown in Figures 6 and 7.

The frame structure described above provides a support for a peripheral wall 17 formed of netting or other suitable material and a top wall 18 of corresponding material.

The peripheral wall 17 is provided with a circular series of spaced openings 19, and secured to the wall 17 in alignment with the openings 19 are the enlarged ends of frusto-conical entrance tubes 20 which are also made of net material. These tubes 20 at their inner smaller ends are provided with suitable cord extensions 21 extended inwardly to the center of the net and are secured to the single ring 22. (See Figures 1 and 2.)

The top wall 18 at its center is provided with an opening and secured to this wall about the opening is a bait bag or receptacle 23 of net material. At its inner or bottom end, the bag 23 is provided with a draw string for closing said end of the bag, and this draw string is tied or otherwise suitably engaged with the ring 22 as also suggested in Figure 2.

The utility and manner of use of the net is thought to be apparent to those skilled in the art. It is apparent that the net is placed in the bed of the river and the carp attracted by the bait in the bag 23 enters the net through the inlet tube 20 and when the carp passes into the net proper through the inner end of the tube 20 it becomes confined in the net, it being understood that to the bottom or base ring 5 there is secured a bottom wall 24 of net material and as suggested in Figure 1. Thus the net provides a trap for positively retaining the carp after the same has once entered thereinto.

As clearly shown in Figure 5, each of the rings, 5, 6 and 7 are split, the split being on an arcuate line providing tapered ends which are lapped as shown in Figure 5 and are secured together by wrapping cord or other suitable stout material 26, thereabout.

Having thus described the invention, what is claimed as new is:

1. A net especially designed for trapping carp, and consisting of a substantially circular skeleton frame structure, and an envelope enveloping said frame structure and consisting of bottom, top and peripheral walls of reticulated material, said peripheral wall being provided with a series of circumferentially spaced openings, and substantially frusto-conical entrance tubes of reticulated material having their larger ends secured to the peripheral wall about said openings, said tubes at their smaller ends having a series of strings extending inwardly toward the center of the net, a bait bag extending inwardly from the top wall of the envelope and provided at its bottom with a draw-string, and means centrally located within the envelope to which all of said strings are secured.

2. A net especially designed for trapping carp, and consisting of a substantially circular skeleton frame structure, and an envelope enveloping said frame structure and consisting of bottom, top and peripheral walls of reticulated material, said peripheral wall being provided with a series of circumferentially spaced openings, and substantially frusto-conical entrance tubes of reticulated material having their larger ends secured to the peripheral wall about said openings, said tubes at their smaller ends having a series of strings extending inwardly toward the center of the net, a single ring to which said strings are secured, said top wall having an opening in the center thereof, and a bait bag of reticulated material secured at one end to the top wall about said opening, and having an inner end provided with a draw string adapted to be engaged with said ring.

3. A net particularly designed for entrapping carp, said net being provided with a plurality of entrance openings, and a lining frame for the net consisting of a plurality of vertically spaced rings and uprights connecting said rings and holding said rings in vertically spaced relation, the lowermost one of said rings being provided with openings, a flexible element threaded through said openings, and tubular weights on said flexible element.

4. A net particularly designed for entrapping carp, said net being provided with a plurality of entrance openings, and a lining frame for the net consisting of a plurality of vertically spaced rings and uprights connecting said rings and holding said rings in vertically spaced relation, said uprights having notches in their respective upper and lower ends engaging the edges of the upper and lowermost rings; and said lowermost ring being provided with a series of openings, a flexible element threaded through said openings, and weights sleeved on said flexible element at predetermined spaced intervals.

5. A net particularly designed for entrapping carp, said net being provided with a plurality of entrance openings, and a lining frame for the net consisting of a plurality of vertically spaced rings and uprights connecting said rings and holding said rings in vertically spaced relation, said uprights having notches in their respective upper and lower ends engaging the edges of the upper and lowermost rings, said uprights also having their respective opposite ends offset to provide inwardly from said ends crotches accommodating the intermediate rings, the lowermost one of said rings being provided with a series of zig-zag openings, a cable threaded through said openings, and tubular weights on said cable.

ALONZO HAUN.